United States Patent
Petrica et al.

(10) Patent No.: US 12,536,036 B2
(45) Date of Patent: Jan. 27, 2026

(54) PROGRAMMABLE DATA MOVEMENT PROCESSOR FOR COLLECTIVE COMMUNICATION OFFLOAD

(71) Applicant: Xilinx, Inc., San Jose, CA (US)

(72) Inventors: Lucian Petrica, Dublin (IE); Kenneth O'Brien, Dublin (IE)

(73) Assignee: Xilinx, Inc., San Jose, CA (US)

( * ) Notice: Subject to any disclaimer, the term of this patent is extended or adjusted under 35 U.S.C. 154(b) by 538 days.

(21) Appl. No.: 18/060,438

(22) Filed: Nov. 30, 2022

(65) Prior Publication Data
US 2024/0176652 A1    May 30, 2024

(51) Int. Cl.
G06F 9/48     (2006.01)
G06F 9/445    (2018.01)
G06F 9/54     (2006.01)

(52) U.S. Cl.
CPC ........ G06F 9/4881 (2013.01); G06F 9/44505 (2013.01); G06F 9/544 (2013.01)

(58) Field of Classification Search
CPC ..... G06F 9/4881; G06F 9/44505; G06F 9/544
USPC ....................................................... 709/238
See application file for complete search history.

(56) References Cited

U.S. PATENT DOCUMENTS

| | | | | |
|---|---|---|---|---|
| 7,743,232 B2 * | 6/2010 | Shen | ....................... | G06F 9/223 712/211 |
| 11,082,327 B2 * | 8/2021 | Nye | ..................... | G06F 15/7825 |
| 11,824,683 B2 * | 11/2023 | Sindhu | .................... | H04L 45/02 |
| 2019/0013965 A1 * | 1/2019 | Sindhu | .................... | H04L 49/10 |
| 2021/0117360 A1 * | 4/2021 | Kutch | .................. | G06F 3/0656 |
| 2022/0255897 A1 * | 8/2022 | Miele | ................. | H04L 63/1425 |

OTHER PUBLICATIONS

He, D. Korolija, et al., "EasyNet: 100 Gbps Network for HLS," 2021 31st International Conference on Field-Programmable Logic and Applications (FPL), 2021, 7 pages.
Q. Xiong, et al., "Accelerating MPI Message Matching through FPGA Offload," 2018 28th International Conference on Field Programmable Logic and Applications (FPL), 2018, 5 pages.
B. Ringlein, et al., "ZRLMPI: A Unified Programming Model for Reconfigurable Heterogeneous Computing Clusters," 2020 IEEE 28th Annual International Symposium on Field-Programmable Custom Computing Machines (FCCM), 97 pages.
Zhenhao He, et al., ACCL: FPGA-Accelerated Collectives over 100 Gbps TCP-IP, 12 pages.

* cited by examiner

*Primary Examiner* — Adil Ocak
(74) *Attorney, Agent, or Firm* — Kevin T. Cuenot (57) ABSTRACT

A system includes a network-on-chip (NoC). The system includes a protocol offload engine coupled to the NoC. The protocol offload engine is configured to generate packets of data for a selected protocol. The system includes a data movement processor coupled to the network-on-chip. The data movement processor is configured to receive a microcode instruction and, in response to the microcode instruction, establish data paths in the NoC that communicatively link a plurality of circuits involved in data transfers of a collective communication operation specified by the microcode instruction. The plurality of circuits include the protocol offload engine. The system includes a network transceiver coupled to the protocol offload engine. The network transceiver is configured to send the packets of data formatted by the protocol offload engine.

19 Claims, 6 Drawing Sheets

In response to receiving offload request from client system, instruction translator translates offload request into microcode instruction
802

Receive and analyze microcode instruction
804

Route slot(s) of microcode instruction to compute units of data movement processor for execution
806

In response to the microcode instruction, establish data path(s) within the network-on-chip, wherein the data paths communicatively link a plurality of circuits involved in the data transfers specified by the microcode instruction
808

Routing compute unit establishes data paths within network-on-chip
810

Initiate, by the data movement processor, the data transfers between the plurality of circuits through the data path(s) of the network-on-chip by providing commands to a data mover circuit coupled to the network-on-chip
812

Operand compute unit(s) initiate data transfer(s) between one or more source circuit(s) and one or more destination circuit(s)
814

Result compute unit(s) initiate data transfer of result data to destination
816

FIG. 8

PROGRAMMABLE DATA MOVEMENT PROCESSOR FOR COLLECTIVE COMMUNICATION OFFLOAD

TECHNICAL FIELD

This disclosure relates to collective communication operations and, more particularly, to offloading collective communication operations to a programmable data movement processor.

BACKGROUND

A distributed computing system includes a plurality of different computational nodes. The computational nodes may be hardware processors such as Central Processing Units (CPUs), Graphics Processing Units (GPUs), programmable integrated circuits (ICs) such as Field Programmable Gate Arrays (FPGAs), or other devices and/or ICs. The computational nodes are communicatively linked by a high-speed network such as, for example, Ethernet or InfiniBand. Distributed applications are able to execute on the distributed computing system with results being synchronized among the computational nodes. The phrase "collective communication" refers to communications among a group of processes as may be embodied as a distributed application executed by the computational nodes of a distributed computing system.

In general, different distributed applications will have different communication patterns among the computational nodes. Certain communication patterns tend to be common from one distributed application to another and, over time, emerge as standards. These individual, standard communication patterns may be defined as part of a larger standardized collection. An example of such a collection is Message Passing Interface (MPI). Examples of the individual communication patterns that may be standardized and included in a collection such as MPI include, but are not limited to, broadcast, scatter/gather, reduce, all-to-all, and/or various combinations of existing communication patterns. MPI defines a large number of communication patterns and the examples provided are not intended to be exhaustive.

In conventional systems, the computational nodes of a distributed computing system expend significant computational overhead implementing these communication patterns. As an illustrative and non-limiting example, a hardware processor such as a CPU or a GPU often devotes approximately 20% of the device's on-chip resources (e.g., different compute circuits) to implementing the message passing mechanisms that enable the communication patterns.

SUMMARY

In one or more example implementations, a system includes a network-on-chip. The system includes a protocol offload engine coupled to the network-on-chip. The protocol offload engine is configured to generate packets of data for a selected protocol. The system includes a data movement processor coupled to the network-on-chip. The data movement processor is configured to receive a microcode instruction and, in response to the microcode instruction, establish data paths in the network-on-chip that communicatively link a plurality of circuits involved in data transfers of a collective communication operation specified by the microcode instruction. The plurality of circuits include the protocol offload engine. The system includes a network transceiver coupled to the protocol offload engine. The network transceiver is configured to send the packets of data formatted by the protocol offload engine.

The foregoing and other implementations can each optionally include one or more of the following features, alone or in combination. Some example implementations include all the following features in combination.

In another aspect, the microcode instruction includes a plurality of slots and each slot specifies a different data transfer initiated by the data movement processor as part of the collective communication operation.

In another aspect, the system includes a configuration memory coupled to the data movement processor. The data movement processor is configured to retrieve, from the configuration memory and in response to the microcode instruction, address information for sending the packets of data.

In another aspect, the system includes a data mover circuit coupled to the network-on-chip. The data movement processor, in response to the microcode instruction, commands the data mover circuit to move data from a source circuit through the established data paths of the network-on-chip to the protocol offload engine.

In another aspect, the system includes a data transformation circuit coupled to the network-on-chip. The data mover circuit, in response to commands received from the data movement processor, moves data from the source circuit to the data transformation circuit prior to the protocol offload engine.

In another aspect, the system includes a data mover circuit coupled to a random-access memory and to the network-on-chip and includes a memory interface coupled to the random-access memory, the data mover circuit, and the protocol offload engine. The memory interface includes a first-in-first-out (FIFO) memory and is configured to intercept data write operations directed to selected addresses of the random-access memory and store data from the data write operations in the FIFO memory in lieu of storing the data in the random-access memory.

In another aspect, the memory interface is configured to intercept data read operations directed to the selected addresses and read data specified by the data read operations from the FIFO memory instead of directing the data read operations to the random-access memory.

In another aspect, the protocol offload engine is a remote data memory access engine. The remote data memory access engine is configured to initiate memory read operations and memory write operations to the memory interface.

In one or more example implementations, a data movement processor includes a microcode fetch circuit configured to receive a microcode instruction from a client system. The microcode instruction specifies data transfers of a collective communication operation. The data movement processor includes a plurality of compute unit circuits. The data movement processor includes a microcode dispatch circuit coupled to the plurality of compute unit circuits and the microcode fetch circuit. The microcode dispatch circuit is configured to distribute slices of the microcode instruction to different ones of the plurality of compute unit circuits to effectuate the collective communication operation. A selected compute unit circuit of the plurality of compute unit circuits, in response to the microcode instruction, configures a network-on-chip to establish data paths therein that communicatively link different ones of a plurality of circuits for performing the data transfers of the collective communication operation.

The foregoing and other implementations can each optionally include one or more of the following features, alone or in combination. Some example implementations include all the following features in combination.

In one aspect, the data movement processor includes a score board circuit coupled to the microcode dispatch circuit. The score board circuit is configured to track availability of the plurality of compute unit circuits over time.

In another aspect, the data movement processor includes a command align, dispatch, and retire circuit coupled to each of the plurality of compute unit circuits. The command align, dispatch, and retire circuit is configured to receive commands from the plurality of compute unit circuits and enforce timing rules among the received commands.

In another aspect, the command, align, dispatch, and retire circuit is configured to send status information for the plurality of compute unit circuits to the score board circuit. The score board circuit updates the availability of the plurality of compute unit circuits in response to the status information.

In another aspect, the data movement processor includes a receiver allocator circuit configured to allocate a portion of a random-access memory to data that is received via a network transceiver. The receiver allocator circuit is configured to issue data movement commands to a data mover circuit to move the data as received to the allocated portion of the random-access memory.

In another aspect, the receiver allocator circuit is coupled to a selected compute unit circuit of the plurality of compute unit circuits designated for operands. The receiver allocator circuit is configured to receive a query from the selected compute unit circuit for a buffer containing the data and, in response to determining a match to the query, provide an address of the buffer to the selected compute unit circuit.

In another aspect, the microcode instruction includes a plurality of slots, wherein each slot specifies a different data transfer of the collective communication operation.

In another aspect, a selected compute unit circuit of the plurality of compute unit circuits is configured to issue commands to a data mover circuit to move operand data from a random-access memory through the network-on-chip to one or more destination circuits. The commands are issued by the selected compute unit circuit in response to the microcode instruction.

In another aspect, the one or more destination circuits include at least one of a protocol offload engine or a data transformation circuit.

In another aspect, a selected compute unit circuit of the plurality of compute unit circuits that handles results is configured to issue commands to a protocol offload engine to transmit result data to another system. The selected compute unit circuit issues the commands in response to the microcode instructions.

In one or more example implementations, a method includes receiving, within a data movement processor disposed in an integrated circuit, a microcode instruction specifying a collective communication operation. The method includes, in response to the microcode instruction, establishing data paths within a network-on-chip disposed in the integrated circuit. The data paths communicatively link a plurality of circuits involved in data transfers that form the collective communication operation as specified by the microcode instruction. The method includes initiating, by the data movement processor, the data transfers between the plurality of circuits through the data paths of the network-on-chip by providing commands to a data mover circuit coupled to the network-on-chip.

The foregoing and other implementations can each optionally include one or more of the following features, alone or in combination. Some example implementations include all the following features in combination.

In another aspect, the method includes storing data directed to selected addresses of a random-access memory to a FIFO memory in lieu of the random-access memory. The method also includes reading the data from the FIFO memory in response to read operations specifying the selected addresses instead of directing the read operations to the random-access memory.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to collective communication operations and, more particularly, to a programmable data movement processor to which collective communication operations may be offloaded. In accordance with the inventive arrangements described within this disclosure, methods, systems, and computer program products are disclosed that are capable of orchestrating movement of data between different computational nodes of a distributed computing system. The inventive arrangements provide a programmable circuit architecture to which collective communications may be offloaded from a client system such as a hardware processor thereby relieving that hardware processor of the overhead incurred from managing the collective communications.

In one or more example implementations, the programmable data movement processor may be implemented in a stand-alone chip or IC, in a dedicated chiplet that is included in an IC package with, for example, a CPU and/or GPU, or integrated on the same die/silicon with a CPU and/or GPU. The programmability provides the programmable data movement processor with the ability to adapt collective communication operations to the particular underlying communication fabric(s) used. For example, the programmable data movement processor is capable of adapting the collective communications to a given network topology, distributed application, and/or network protocol (e.g., Transmission Control Protocol (TCP), User Datagram Protocol (UDP), and/or Remote Data Memory Access (RDMA)).

The inventive arrangements implement collective communication operations with lower latency and higher data throughput than other conventional hardware processor-based arrangements that execute software libraries. This increase in data throughput and reduced latency can be advantageous in many different types of applications including, for example, High Performance Computing, Artificial Intelligence, machine learning training, and the like.

Figure 1:
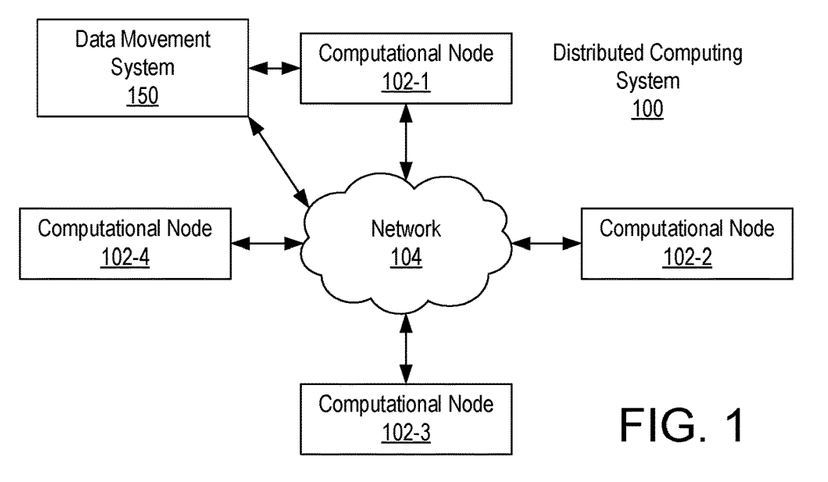
FIG. 1 illustrates an example of a distributed computing system including a plurality of computational nodes and a data movement system.

FIG. 1 illustrates an example of a distributed computing system 100 including a plurality of computational nodes 102 (e.g., computational nodes 102-1, 102-2, 102-3, and 102-4) and a data movement system 150. Each of computational nodes 102 and data movement system 150 is communicatively linked to network 104. Network 104 may be implemented as any of a variety of high-speed networks. For example, network 104 may be implemented as an Ethernet network, as an InfiniBand (IB) network, or the like.

In the example of FIG. 1, distributed computing system 100 executes a distributed application. In the example, in executing a distributed application, computational nodes 102 of distributed computing system 100 communicate, at least in part, by way of collective communication operations. As defined within this disclosure, the term "collective communication operation" means a predetermined communication pattern among a plurality of computational nodes that is formed of a plurality of smaller constituent data transfers that, taken collectively, are treated as a single, unified operation. Examples of collective communication operations include one or more of those discussed herein (e.g., broadcast, scatter/gather, reduce, all-to-all, and/or various combinations of existing communication patterns) and/or any one or more of the collective communication operations supported by protocols such as MPI or the like. Accordingly, data movement system 150 is capable of setting up collective communication operations on behalf of computational node 102-1. That is, computational node 102-1 is capable of offloading one or more collective communication operations to be performed in executing the distributed application to data movement system 150. Data movement system 150 is capable of performing the collective communication operations as offloaded.

In one or more other example implementations, data movement system 150 may be coupled to computational node 102-1 via a communication channel (not shown) that directly links the two nodes and does not flow through network 104.

In one aspect, data movement system 150 may be implemented as an integrated circuit (IC). For example, the system may be implemented as a single, e.g., one, integrated circuit.

Figure 2:
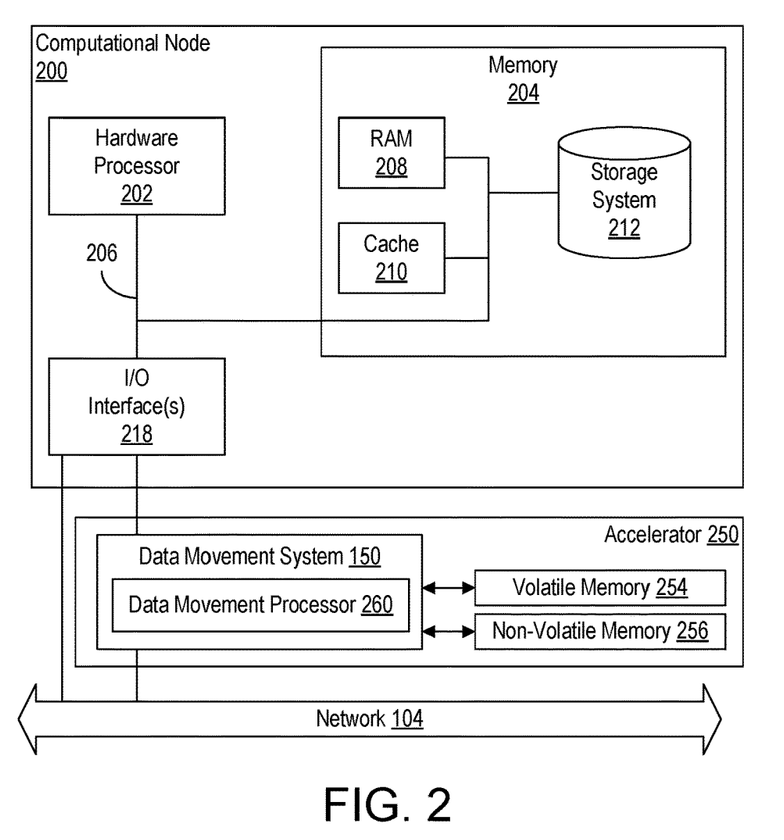
FIG. 2 illustrates an example implementation of a computational node.

FIG. 2 illustrates an example implementation of a computational node 102. In the example, computational node 102 is implemented as a data processing system and is communicatively linked to an accelerator 250 that includes data movement system 150. As defined herein, the term "data processing system" means one or more hardware systems configured to process data, where each hardware system includes at least one hardware processor and memory, where the hardware processor is programmed with computer-readable instructions that, upon execution, initiate operations. Computational node 102 can include a hardware processor 202, a memory 204, and a bus 206 that couples various system components including memory 204 to processor 202.

Hardware processor 202 may be implemented as one or more hardware processors. In an example, hardware processor 202 is implemented as a central processing unit (CPU). Hardware processor 202 may be implemented as one or more circuits capable of carrying out instructions contained in program code. The circuit may be an integrated circuit or embedded in an integrated circuit. Hardware processor 202 may be implemented using a complex instruction set computer architecture (CISC), a reduced instruction set computer architecture (RISC), a vector processing architecture, a GPU, or other known architecture. Example processors include, but are not limited to, processors having an x86 type of architecture (IA-32, IA-64, etc.), Power Architecture, ARM processors, and the like.

Bus 206 represents one or more of any of a variety of communication bus structures. By way of example, and not limitation, bus 206 may be implemented as a Peripheral Component Interconnect Express (PCIe) bus. Computational node 102 typically includes a variety of computer system readable media. Such media may include computer-readable volatile and non-volatile media and computer-readable removable and non-removable media.

Memory 204 can include computer-readable media in the form of volatile memory, such as random-access memory (RAM) 208 and/or cache memory 210. Computational node 102 also can include other removable/non-removable, volatile/non-volatile computer storage media. By way of example, storage system 212 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 206 by one or more data media interfaces. Memory 204 is an example of at least one computer program product.

Memory 204 is capable of storing computer-readable program instructions that are executable by hardware processor 202. For example, the computer-readable program instructions can include an operating system, one or more application programs, other program code, and program data. Hardware processor 202, in executing the computer-readable program instructions, is capable of performing the various operations described herein that are attributable to a computer. It should be appreciated that data items used, generated, and/or operated upon by computational node 102 are functional data structures that impart functionality when employed by computational node 102. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Computational node 102 may include one or more Input/Output (I/O) interfaces 218 communicatively linked to bus 206. I/O interface(s) 218 allow computational node 102 to communicate with one or more external devices and/or communicate over one or more networks (e.g., network 104) such as a local area network (LAN), a wide area network (WAN), and/or a public network (e.g., the Internet). Examples of I/O interfaces 218 may include, but are not limited to, network cards, modems, network adapters, hardware controllers, etc. Examples of external devices also may include devices that allow a user to interact with computational node 102 (e.g., a display, a keyboard, and/or a pointing device) and/or other devices such as accelerator 250.

FIG. 2 illustrates only one example implementation of computational node 102. Computational node 102 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

The example of FIG. 2 is not intended to suggest any limitation as to the scope of use or functionality of example implementations described herein. Computational node 102 is an example of computer hardware that is capable of performing the various operations described within this disclosure. In this regard, computational node 200 may include fewer components than shown or additional components not illustrated in FIG. 2 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

FIG. 2 illustrates an example where computational node 102 (e.g., a client system) is capable of offloading one or more collective communication operations to data movement system 150. In the example, data movement system 150 is implemented as a separate chip or IC that may be disposed on accelerator 250. Accelerator 250 may be implemented as a circuit board that communicatively links to computational node 102. Accelerator 250 may, for example, be inserted into a card slot, e.g., an available bus and/or PCIe slot, of computational node 102. In an example implementation, I/O interface 218 may be implemented as a PCIe adapter such that computational node 102 and accelerator 250 communicate over a communication link, e.g., a PCIe communication channel.

Accelerator 250 includes data movement system 150. Depending on the type of IC in which data movement system 150 is implemented, accelerator 250 also may include a volatile memory 254 coupled to data movement system 150 and a non-volatile memory 256 also coupled to data movement system 150. Volatile memory 254 may be implemented as a RAM. Non-volatile memory 256 may be implemented as flash memory. In one aspect, data movement system 150 may include a data movement processor 260. Data movement processor 260 is configured to initiate and manage collective communication operations. The collective communication operations may involve sending and/or receiving data via network 104, to which data movement system 150 and data movement processor 260 are communicatively linked. In one or more examples, data movement processor 260 may be used as part of a Network Interface Controller (NIC) or other system to process packets and/or data received via network 104, for example.

The example of FIG. 2 is provided for purposes of illustration only. As such, the example of FIG. 2 is not intended as a limitation of the inventive arrangements described within this disclosure. As discussed, data movement system 150 and/or data movement processor 260 may be implemented as a stand-alone chip or IC; in a dedicated chiplet that is included in an IC package with, for example, a CPU, GPU, or other chips and/or chiplets; or be integrated or disposed on the same die/silicon with a CPU and/or GPU. For example, data movement system 150 and/or data movement processor 260 may be implemented in a same package with hardware processor 202 and/or may be implemented on the same circuit board as hardware processor 202.

Figure 3:
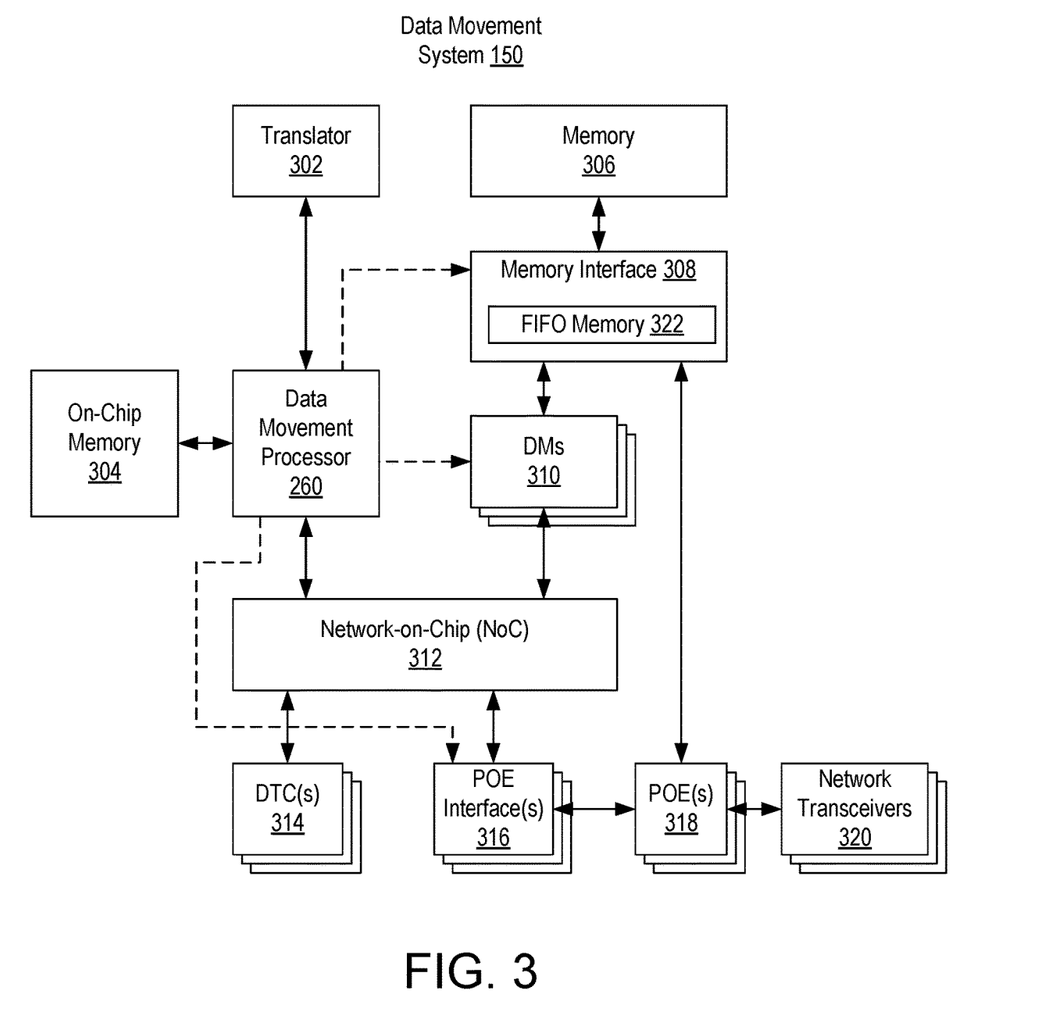
FIG. 3 illustrates an example data movement system.

FIG. 3 illustrates an example of data movement system 150. In the example, data movement system 150 includes a variety of components each implemented as circuitry. For example, data movement system 150 can include an optional translator 302, an on-chip memory 304, a data movement processor 260, a memory 306 (e.g., volatile memory 254), a memory interface 308, one or more data movers 310 (illustrated as DMs 310), a network-on-chip (NoC) 312, one or more data transformation circuits 314 (shown as DTC(s) 314 in FIG. 3), one or more protocol offload engine (POE) interfaces 316, one or more POEs 318, and one or more network transceivers 320.

In the example, translator 302 is capable of receiving offload requests from client systems. Offload requests may be high-level requests from a client system such as computational node 102-1 to offload selected or particular collective communication operations to data movement system 150. As noted, the client system may be or include a CPU, a GPU, or other hardware processor type. Optional translator 302 translates each received offload request from the client system into one or more microcode instructions that is/are provided to data movement processor 260.

In one or more other example implementations, optional translator 302 may be omitted. For example, in cases where the client system that is offloading collective communication operations to data movement system 150 is configured to generate microcode instructions as opposed higher-level offload requests, translator 302 may be omitted such that any microcode instructions received from the client system are received directly by data movement processor 260.

In one or more examples, translator 302 is implemented as a microcontroller executing program code. In one or more other examples, translator 302 is implemented using programmable (e.g., reconfigurable) circuitry or logic. In one or more other examples, translator 302 is implemented as hardwired circuitry.

Accordingly, data movement system 150 is capable of receiving, as input, a stream of pre-compiled microcode instructions emitted from a client system such as a CPU or a GPU. In another aspect, data movement system 150 may receive offload requests from the client system, where the offload requests are equivalent to MPI collectives or specify a high-level, predetermined communication pattern. In that case, the high-level commands are translated to microcode instructions by translator 302. The microcode instruction stream can correspond to one collective communication operation or to multiple collective communication operations executing simultaneously. Optionally, the microcode instructions are compacted by, for example, removing unused fields or the like to reduce the number of bytes per microcode instruction in cases when the communication link between translator 302 and data movement processor 260 is throughput constrained. In one aspect, translator 302 may be connected to data movement processor 260 through a FIFO memory or another type of memory (not shown).

In one aspect, instruction packing may be used. Instruction packing is a technique that facilitates decreased code size, reduced power consumption, and improved performance. Instruction packing may be implemented by placing frequently occurring microcode instructions into an Instruction Register File (IRF). Multiple IRF entries may be accessed using special packed instructions. Instruction unpacking may be implemented between fetch and dispatch operations (e.g., as performed by microcode fetch 402 and microcode dispatch 404, respectively, in the example of FIG. 4 and described in greater detail below).

Data movement processor 260 is capable of receiving, interpreting, and executing microcode instructions. In this regard, data movement processor 260 is programmable. The functionality of data movement processor 260 may be changed over time by providing a different stream of microcode instructions thereto. The microcode instructions (e.g., or each microcode instruction as the case may be) define a step-by-step sequence of instructions for initiating and/or performing a collective communication operation. In response to the microcode instructions, data movement processor 260 is capable of providing commands to various other circuit blocks illustrated to initiate and/or perform the individual data movement operations that, taken collectively, form the collective communication operation. In the example, the dashed lines illustrate data movement processor 260 providing commands to the components illustrated.

On-chip memory 304 stores configuration information for use by data movement processor 260. Memory 306 may be implemented as a random-access memory (RAM). For example, memory 306 may be implemented as any of a variety of available RAMs such as Dynamic RAMs (DRAM), Double Data Rate (DDR) RAM, High-Bandwidth Memory (HBM), and/or other high-speed RAMs. Memory 306 is used to store data that is to be conveyed by way of the collective communication operations. In one aspect, memory 306 is be located on the same chip or IC as data movement processor 260. In another aspect, memory 306 is located off chip from data movement processor 260.

NoC 312 is a programmable interconnecting network for sharing data between endpoint (e.g., source(s) and destination(s)) circuits in an IC. NoC 312 can include high-speed data paths with dedicated switching. NoC 312 also supports network connections. In an example, NoC 312 includes one or more horizontal paths, one or more vertical paths, or both horizontal and vertical path(s). NoC 312 is an example of the common infrastructure that is available within an IC to connect selected components and/or subsystems.

In general, the programmability of NoC 312 means that nets (e.g., data paths) that are to be routed through NoC 312 are unknown until a design (e.g., application) is created for implementation within data movement system 150. In one or more examples, NoC 312 may be programmed by loading configuration data into internal configuration registers that define how elements within NoC 312 such as switches and interfaces are configured and operate to pass data from switch to switch and among the ingress/egress (e.g., interface) circuits of NoC 312 that connect to the endpoint circuits. In one or more other examples, NoC 312 is capable of routing packets based on information within the data packets themselves. NoC 312 is fabricated as part of system 100 (e.g., is hardwired) and is programmed to establish network connectivity between different master circuits and different slave circuits of a user circuit design.

In one or more examples, NoC 312, upon power-on, may implement selected data paths for use in configuring components of data movement system 150. Upon power-on, NoC 312, for example, may not implement any data paths or routes therein for implementing a user application (e.g., performing collective communication operations) at least until such time that NoC 312 has been configured with configuration data, whether by loading configuration data or via embedding data within the packets for dynamic routing, specifying routes for nets to connect endpoint circuits of a user application or design.

Memory interface 308 is configured to receive memory access requests (e.g., read and/or write operations) from data movers 310 and POEs 318. Memory interface 308 is capable of comparing the addresses specified by received memory access requests and determining whether the addresses match one or more selected addresses. The selected addresses are for buffers of memory 306 that are aliased, or mapped, onto a first-in-first-out (FIFO) memory 322 within memory interface 308. Certain data may be intercepted and stored in FIFO memory 322 of memory interface 308 as opposed to writing the data to memory 306. Memory interface 308 is capable of evaluating read operations in the same manner so that any read requests for data stored at the selected addresses, may be read from memory interface 308 itself (e.g., FIFO memory 322 therein) as opposed to attempting to read such data from memory 306.

For example, memory interface 308 may include matching logic that is configured to compare addresses. The matching logic, in response to detecting a match of addresses from the comparison performed on a write access from POEs 318 or data movers 310, writes the data to FIFO memory 322 if there is sufficient space. Otherwise, the matching logic writes data to RAM 306. In this regard, RAM 306 may be viewed or used as a spill-over memory for FIFO memory 322.

In the case of read accesses from POEs 318 or from data movers 310, if the matching logic detects a match of addresses from the comparison performed, the read is performed using FIFO memory 322. In this case, memory interface 308 presumes that FIFO memory 322 is already populated from the write process described. After the read occurs from FIFO memory 322, FIFO memory 322 is no longer full. In that case, memory interface 308 moves data from memory 306 to FIFO memory 322 if any data for the aliased buffer was ever written to memory 306 due to FIFO memory 322 being full thereby re-filling FIFO memory 322.

In performing the operations described, memory interface 308 is capable of maintaining state for each aliased buffer. For example, memory interface 308 is capable of maintaining state information for each range of addresses stored in FIFO memory 322 and for each range of addresses stored in memory 306 to manage the read and write processes.

The inclusion of memory interface 308 allows data transfers to be accelerated (e.g., performed in less time). That is, data that would be stored in memory 306 may be stored in FIFO memory 322 of memory interface 308. This allows data streams to be effectively maintained uninterrupted without having to convert the data stream into a format (e.g., memory mapped) for writing to memory 306 and later retrieving such data, which incurs significant delays compared to simply writing the data to FIFO memory 322 of memory interface 308 and subsequently retrieving (e.g., reading) the data from FIFO memory 322. For example, creating aliasing between a buffer and FIFO memory 322 of memory interface 308 allows memory interface 308 to operate as if data were moved directly between multiple data movers 310 and/or between data mover 310 and POEs 318 without having to access memory 306.

One or more data transformation circuits 314 may be connected to NoC 312 to perform various data processing operations. For example, one or more data transformation circuits 314 may be included that are capable of performing reduction, compression, decompression, encryption, decryption, summation, and/or other data transformations. In one aspect, data transformation circuit(s) 314 are capable of performing operations on streaming data. POE interface 316 are connected to NoC 312 to receive data that is to be transmitted by network transceivers 320 over network 104 to other destinations. POE interfaces 316 receive data and provide data to a corresponding POE 318.

Each POE 318 is configured to receive data, e.g., messages from the corresponding POE interface 316, and format the data into one or more packets. For example, POE(s) 318 are capable of forming packets, adding packet headers, and performing other operations necessary for formatting data into well-formed packets for particular protocols for transmission. Each POE 318, for example, may be configured to format data for a selected protocol such as TCP, UDP, or the like.

Network transceivers 320 are connected to network 104 and are capable of sending data as formatted by POE(s) 318 and/or receiving data from network 104. In the example, POE(s) 318 are also capable of receiving data from network 104 by way of network transceivers 320 and providing the data to memory interface 308.

As discussed, data movement processor 260 is capable of operating on microcode instructions. In one or more example implementations, each individual microcode instruction includes a plurality of different portions that may be referred to as slots. In one aspect, each microcode instruction may be specified as a Very Long Instruction Word (VLIW) having a plurality of slots. Each slot, or portion of the microcode instruction, may define a particular data movement operation of a larger communication collection operation. That is, each of the portions or slots may define data to be moved, a source (circuit) from which the data is to be obtained, and a destination (circuit) to which the data is to be delivered. In one example, each microcode instruction includes 3 slots, wherein each slot may specify a data transfer of a collective communication operation.

For example, a single microcode instruction having 3 slots may utilize 2 slots to dictate data movement operations from either one or two operand buffers (e.g., mapped to memory 306 and/or aliased to FIFO memory 322) into data movement system 150. The first 2 slots may move data from memory 306 and/or FIFO memory 322 to a data transformation circuit 314 that is configured to perform a data transformation (e.g., reduction, compression, decompression, summation, etc.) on the received data (e.g., the 1 or 2 buffers). The $3^{rd}$ slot may dictate data movement of a result generated by the selected data transformation circuit(s) 314 to a result buffer (e.g., mapped to memory 306 and/or aliased to memory interface 308) or to network 104.

In the example of FIG. 3, the transformations and data movements described are enabled by routing the data, inclusive of results, through specific data paths established in NoC 312. As noted, transformations may be applied in streaming fashion by dedicated circuit blocks (e.g., selected data transformation circuit(s) 314. This means that the entirely of the data to be operated on by selected data transformation circuit(s) 314 need not be stored in a buffer accessible by the selected data transformation circuits(s) 314 prior to starting operation. Rather, the selected data transformation circuit(s) 314 may operate on data that is streamed as received and output data as generated for conveyance to the next circuit or destination.

In another example, consider the case in which a client system, such as a CPU or a GPU executing an application, offloads a broadcast type of collective communication operation to data movement system 150. In one aspect, the client system may provide an offload request for a broadcast to translator 302. Translator 302 generates the microcode instruction(s) implementing the broadcast and provides the microcode instruction(s) to data movement processor 260. As noted, in other examples, the client system may provide the microcode instruction(s) directly to data movement processor 260.

In implementing the broadcast type of collective communication operation, data movement processor 260 parses the received microcode instruction(s) and accesses on-chip memory 304 to obtain network (e.g., Internet Protocol) addresses, TCP session numbers for destinations of data going out for broadcast, or other information that is specific to the type, e.g., the particular communication protocol to be used, of the data transfer to be performed. In this example, data movement processor 260 reads on-chip memory 304 to obtain TCP session numbers. In this example, data movement processor 260 has determined that data is to be broadcast to nodes A, B, and C (e.g., 3 nodes). Accordingly, data movement processor 260 must broadcast data to TCP sessions 0, 1, and 2 (e.g., 3 sessions).

In this example, data movement processor 260 must retrieve data from memory 304 using data movers 310 and transfer the data to appropriate POE(s) 318 that are configured to perform the type of data transfer noted (e.g., TCP). To effectuate the data transfers, data movement processor 260 creates a route, e.g., data path, between data mover(s) 310 that are to perform the data transfer and the POE(s) 318 that are to receive the data to be broadcast by programming NoC 312. That is, data movement processor 260 configures NoC 312 to establish the data path(s) necessary so that date mover(s) 310 may convey data from memory 306 to the selected POE interfaces 316. With the data path(s) established through NoC 312, data movement processor 260 commands the data mover(s) 310 to copy the data to be broadcast from memory 306 to the POE interface(s) 316 of the particular POE(s) 318 to be used for the broadcast. Performing the foregoing operations implements one send operation. In the case where the broadcast is to 3 nodes (A, B, and C), the operations are repeated 2 more times. It should be appreciated that NoC 312 need only be configured one time for the broadcast operation, while the particular copy operations described are performed 3 times. The data movers 310 will copy data to the POE interface(s) 316 as many times as ordered by data movement processor 260.

A variety of other types of communication primitives (e.g., types of data transfers) may be performed using the same data paths established in NoC 312 by data movement processor 260. As another example, another type of collective communication operation, e.g., a reduction, may be performed that requires a data transformation. In that case, data movement processor 260 instructs data mover(s) 310 to move data from memory 306 to a data transformation circuit 314 through NoC 312. In this case, data movement processor 260 configures NoC 312 to establish a data path from one or more selected data movers 310 through NoC 312 to the data transformation circuit 314. Further, data movement processor 260 also configures NoC 312 to establish a data path from the data transformation circuit 314 through NoC 312 to a selected POE interface 316 thereby facilitating the transmission of the results from the data transformation circuit 314 to network 104.

For example, rather than programming NoC 312 by programming registers, data movement processor 260 establishes the data paths by causing destination information to be embedded within the packets that are to be routed through NoC 312. NoC 312 performs dynamic routing based on the destination information included in the packets by data movement processor 260. As an illustrative example, data movement processor 260 issues instructions to an input NoC interface. The instructions may specify information such as, for example, "route the next N bytes of data received on this input NoC interface to output NoC interface Y" where N is the number of bytes and Y specifies the particular destination NoC interface of NoC 312 to which the packets of data are to be sent. One advantage of this implementation is that any collective communication operation can execute simultaneously with another collective communication operation without having to determine (and/or store) the proper static NOC configuration for each possible combination of collectives.

In the above example, the first two slots of a microcode instruction can specify the data transfers that move two buffers from memory 304 to the data transformation circuit 314. The $3^{rd}$ slot may specify the data transfer that conveys the result from the data transformation circuit 314 to a selected POE interface 316. The $3^{rd}$ slot, for example, may specify TCP session numbers and/or any metadata that may be needed. The three data movement operations may be included in the same microcode instruction since the data movement operations are performed largely at the same time. As noted, data transformation circuits 314 may operate on the streaming data to maintain the data stream (e.g., without first having to buffer the entirety of data that is being operated upon).

In general, the first 2 slots may move data from memory 306 to other destinations in data movement system 150 such as data transformation circuits 314 or selected POE interfaces 316. The $3^{rd}$ slot may move data (e.g., results) to a destination in data movement system 150 such as selected POE interfaces 316 or move the result data back to memory 306 or FIFO memory 322 as may be the case.

The example architecture illustrated in FIG. 3 addresses the lack of programmability that exists in other conventional collective communication systems that are implemented in dedicated hardware. Such conventional systems are often preconfigured to perform operations a particular way. In the case of a broadcast type of collective communication operation, for example, a conventional hardware-based system may be preconfigured to broadcast a fixed amount of data to a fixed number of nodes using a fixed communication protocol. To change the number of nodes to which data is to be broadcast, the amount of data to be broadcast, and/or the communication protocol to be used for the broadcast, the hardware solution must be resynthesized and redeployed. In the example of FIG. 3, each of the aforementioned aspects of the data transfer (e.g., number of nodes to which data is broadcast, amount of data to be broadcast, and/or the protocol to be used) may be programmed by way of providing suitable microcode instructions to data movement processor 260 over time and modifying such microcode instructions as provided over time.

Other conventional software-based solutions typically require many clock cycles to complete a given collective communication operation. For example, a particular collective communication operation may take hundreds or thousands of clock cycles. The example of FIG. 3 is capable of performing such collective communication operations in significantly less time (e.g., several clock cycles) owing to the hardware implementation, while still providing the aforementioned programmability. In some cases, the inventive arrangements provide a reduction of 2×-10× in latency for data transfers.

In one aspect, one or more or all of the components of FIG. 3 may be implemented as hardwired circuit blocks. In another aspect, one or more of the components of FIG. 3 (e.g., data movement processor 260, memory interface 308, data mover(s) 310, data transformation circuits 314, POE interfaces 316, and/or POE(s) 318) may be implemented using programmable circuitry. In other arrangements, one or more of the components of FIG. 3 may be implemented as hardwired circuit blocks while the others are implemented using programmable circuitry. Programmable circuitry includes programmable logic.

Figure 4:
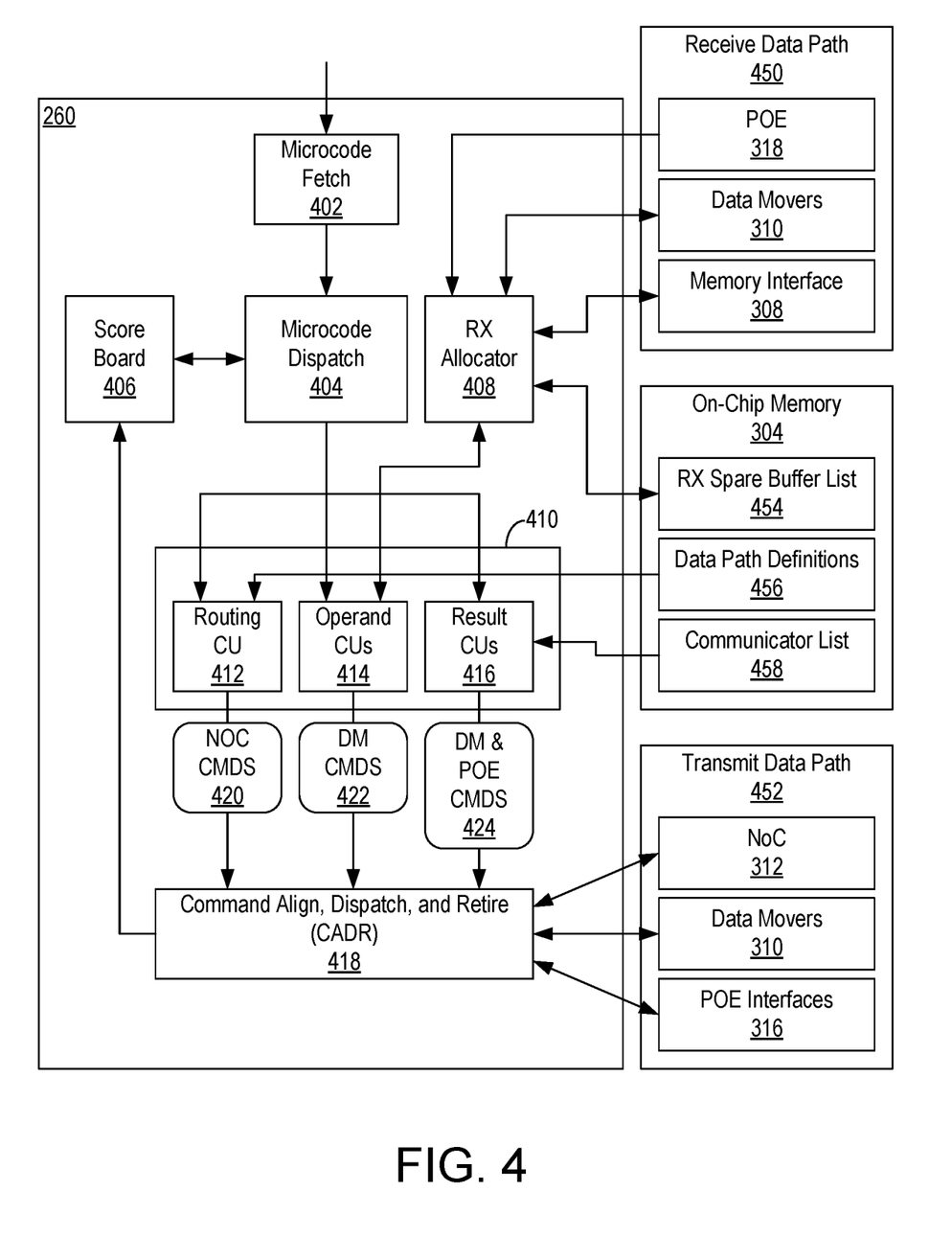
FIG. 4 illustrates an example data movement processor.

FIG. 4 illustrates an example of data movement processor 260 of FIG. 3. In the example of FIG. 4, data movement processor 260 includes a microcode fetch 402, a microcode dispatch 404, a score board 406, an RX (e.g., receive) allocator 408, a plurality of compute units 410, and a command align, dispatch, and retire (CADR) circuit 418. Compute units 410 may include a routing compute unit 412, one or more operand compute units 414, and one or more result compute units 416. Each of the various components of data movement processor 260 is implemented using circuitry (e.g., as a circuit block).

Microcode fetch 402 is capable of receiving microcode instructions from a client system or from translator 302 as described. Microcode fetch 402 is capable of retrieving or receiving the microcode instructions and, if necessary, decompressing the microcode instructions. Microcode fetch 402 then provides the resulting microcode instructions, as processed, to microcode dispatch 404.

Microcode dispatch 404 is capable of inspecting, e.g., analyzing and/or parsing the microcode instructions. Based on the content of the microcode instructions, microcode dispatch 404 forwards a portion of each microcode instruction (e.g., a particular slot of the VLIW) to an execution lane selected from a list of available execution lanes referred to herein as compute units 410. That is, for each microcode instruction received by microcode dispatch 404, microcode dispatch 404 is capable of detecting different portions (e.g., slots) thereof and the slots of that microcode instruction to routing compute unit 412, operand compute unit(s) 414, and/or result compute unit(s) 416.

Score board 406 is optionally included. Score board 406, when included, may be used to assist in the dynamic selection of compute units 410 to which slices are forwarded from microcode dispatch 404. In one or more examples, score board 406 is configured to track availability of the plurality of compute units 410 over time. In general, CADR 418, in receiving commands from the various compute units, is capable of determining when a compute unit has completed a given operation and is available for performing another operation. CADR 418 is capable of providing status information for the plurality of compute units to score board 406. The status information may indicate which compute units 410 are busy and/or which compute units are free (available). Score board 406, in response to the received status information, updates the availability of the plurality of compute units 410. Microcode dispatch 404, which is coupled to score board 406, may select an available one of the one or more operand compute units 414 and/or an available one of the one or more result compute units 416 to which slices of microcode instructions are routed based on content (e.g., whether the slice is to be directed to operand compute unit(s) 414 or result compute unit(s) 416) and the availability of the respective compute units.

In the example of FIG. 4, the compute units 410 are specialized by the data path resource type each controls. Operation of compute units 412, 414, and 416 entails emitting commands to functional circuit blocks in the data path or emitting commands that establish data paths.

In the example, routing compute unit 412 configures NoC 312. That is, routing compute unit 412, in response to receiving a microcode instruction (e.g., one or more slots thereof), determines the particular route to be traversed by each packet of data involved in the data transfers defined by the microcode instruction. As sources and destinations are specified for each slot, routing compute unit 412 is capable of determining the route to be taken and configuring NoC 312 to implement the data path(s) needed to route the data packets to effectuate the data transfers specified by each slot of the microcode instruction.

With respect to routing compute unit 412, microcode dispatch 404 is capable of providing relevant information from each slot to routing compute unit 412 so that routing compute unit 412 may properly instruct NoC 312. The relevant information may not be the entirety of a microcode instruction. In this example, the relevant information includes which NoC interfaces will be used (e.g., source and destination) and how many bytes will be transferred between the NoC interfaces. Though not illustrated in FIG. 3, NoC 312 includes a plurality of NoC interfaces (e.g., input and output). In one or more examples, the NoC interfaces may be NoC master units (e.g., circuits) and NoC slave units (e.g., circuits). Endpoint circuits connect to these NoC interfaces to convey data among the NoC interfaces and, as such, endpoint circuits.

In one aspect, routing compute unit 412, in response to receiving the microcode instruction, accesses data path definitions 456 stored in on-chip memory 304. In an example implementation, data path definitions 456 is a listing of configuration data (e.g., NoC commands 420) that establish a data path through NoC 312 for a given source-destination pair. Routing compute unit 412 is capable of looking up from data path definitions 456 the particular NoC commands 420 to be issued by routing compute unit 412 to establish data paths in NoC 312 of transmit data path 452 to effectuate the data transfers specified by the microcode instruction. NoC commands 420 may be issued by routing compute unit 412 via CADR 418 to NoC 312 to write the configuration data into configuration registers of NoC 312 to create the data paths therein.

Operand compute unit(s) 414, in response to slots of microcode instructions, emit data movement (DM) commands 422 to the one or more data movers 310 instructing the data movers 310 to read operands (e.g., data to be moved) from buffers in memory 306 or FIFO memory 322. In one aspect, the addresses of the data movement commands 422 may be provided as immediate values in the microcode instruction. In another aspect, the addresses of data movement commands 422 may be generated by the operand compute unit(s) 412 by operating on an address register file, which can be compute unit specific or shared between the compute units. Operations performed on addresses by compute units may include reusing an address to perform a stride on the address and/or obtaining an address by querying (e.g., interrogating) RX allocator 408 as described in greater detail below.

The one or more result compute units 416 are capable of emitting data movement commands and/or POE (DM & POE) commands 424. Data movement commands may be emitted to move result data as may be output from a data transformation circuit 314 to memory 306 or FIFO memory 322. POE commands may be emitted to POEs 318 in cases where result data is to be transmitted off-chip. In the example of FIG. 4, result compute units 416 are capable of accessing communicator list 458. In one or more examples, communicator list 458 stores the network addressing information (e.g., IP addresses, session information, etc.) that is needed for POEs 318 and network transceivers 320 to send data in accordance with the microcode instructions.

RX allocator 408 is an interface between operand compute unit(s) 412 and receive data path 450. Data that is expected and received by data movement system 150 from an off-chip source may be stored in memory 306 by POEs 318. RX allocator 408 is capable of continuously monitoring for data receive notifications. In response to receiving a receive data notification, e.g., from memory interface 308, indicating that data has been received via network transceiver(s) 320, RX allocator 408 allocates buffers from a pool of available buffers to store the received data. The available buffers are maintained within RX spare buffer list 454 stored within on-chip memory 304. RX allocator 408 informs memory interface 308 of the buffer addresses so that the received data may be stored in the allocated buffers. RX allocator 408 then stores an association between the received data and the allocated buffer(s) locally therein. RX allocator 408 is capable of providing the buffers (e.g., addresses of the buffers) to operand compute unit(s) 414 upon request. For example, an operand compute unit 414 may interrogate or query RX allocator 408 by sending metadata for data that is sought after by operand compute unit 414. RX allocator 408 attempts to match the metadata from the query with metadata of the received data. In response to determining a match, RX allocator 408 returns the buffer address to the requesting operand compute unit 414.

It should be appreciated that the operand compute unit(s) 414 and/or the result compute unit(s) 416 are capable of performing segmentation of any data that is to be moved. The segmentation allows the data to be moved in several steps if required. For example, segmentation may be necessary in cases where the data to be transferred is larger than the maximum transfer size of a data mover 310. Segmentation also may be necessary in cases where an operand is being retrieved from a receive buffer and only part of the data has been received.

CADR 418 receives commands generated by routing compute unit 412, operand compute unit(s) 414, and result compute unit(s) 416 and sends the commands to the data path functional units that are to receive the commands (e.g., NoC 312, data movers 310, and/or POE interfaces 316). CADR 418 is capable of emitting selected commands simultaneously or such that the selected commands are aligned. CADR 418 may perform the alignment functionality by enforcing timing rules relating to emitting the received commands. The selected commands may be any commands requiring such handling and may include, for example, commands derived from a same microcode instruction. An example where the alignment or simultaneous emitting of commands is necessary, per timing rules of CADR 418, is the case of data reduction where two operands (e.g., of a particular microcode instruction) must align on the inputs of a reduction functional block (e.g., a data transformation circuit 314). The acknowledgements from the data path functional units may be received by CADR 418. In response to determining that an entire data transfer completes, CADR 418 notifies score board 406 that the particular compute unit involved in the data transfer is free. In the example, CADR 418 indicates which buffers are to be released in response to instructions from operand compute unit(s) 414 that specify which buffer, if any, is to be released upon completion of data movement.

In the example of FIG. 4, address logic within memory interface 308 receives requests for accesses to memory 306 (e.g., read operations and write operations) from data movers 310 and from POEs 318. The address logic compares the addresses specified by the memory access requests with a list of selected addresses for which buffers have been aliased to FIFO memory 322. That is, the selected addresses specify addresses of buffers that have been designated for storage in FIFO memory 322 and not in memory 306. The address logic is capable of intercepting those memory access requests that specify selected addresses and executing the memory access requests against FIFO memory 322. Those memory access requests that specify an address that is not a selected address are passed through by the address logic to memory 306. Results from memory 306 also may pass through unaffected by address logic.

When working with transport protocols such as TCP and UDP that command data movement through sockets, the examples of FIGS. 3 and 4 herein are capable of pulling data directly from the POE socket streams into the data path for processing and onward for transmission. In the case of an RDMA Network Interface Controller or a RDMA implementation of a POE that exposes verbs such as READ and WRITE, data movement processor 260 must utilize these verbs to command the POE. These verbs act on memory buffers. While the verbs are in execution, the POE has control over the buffers. In cases where the received data needs processing (e.g., decompression and/or reduction with local data before sending onward to network 104), the data (1) must be placed in a buffer; (2) the buffer must be read and any such operations performed; and (3) the results must be sent from a buffer. The RDMA POE only sees buffers, for example. None of these steps may start before the prior step completes, which increases latency. Writing intermediate results to external memory (e.g., buffers in memory 306) also increases power dissipation.

In accordance with the inventive arrangements described herein, the use of memory interface 308 allows the RDMA operations described above to be performed faster and with less power dissipation. Memory interface 308 operates to allow such processing to be performed in a streaming manner as opposed to storing intermediate data in buffers in memory 306. Operations may be performed directly on received data to minimize latency and avoid unnecessary writes to memory 306.

In one or more examples, "fake" memory buffers may be exposed to the RDMA POE. These fake memory buffers may be aliased (e.g., partially and/or dynamically aliased) to FIFO memory 322, which is located on-chip with data movement processor 260. From the point of view of an RDMA POE, the fake buffers are mapped into the virtual address space like all other buffers and are accessed through a memory port controlled by RX allocator 408, which performs the dynamic address modifications. That is, RX allocator 408 updates memory interface 308 (e.g., a table within the address logic) to define which of addresses are "selected" addresses that correspond to aliased buffers.

For purposes of illustration, consider the operations to be performed for a "compressed reduce" type of collective communication operation on all nodes except the first node and the last node in a chain. The expression WRITE(F($X_i$, $Y_i$, $Z_i$), $X_{i+1}$) may be interpreted as follows. The subexpression F($X_i$, $Y_i$, $Z_i$) denotes an arbitrary composition of compression, decompression, and reduction functions operating on $X_i$, $Y_i$ and producing $Z_i$. In the expression, Y represents local data to be reduced and X specifies a set of buffers used as targets for WRITE operations. In the general case, the operations start with a notification of a received WRITE into $X_i$. Next, the function F is executed by moving data through NoC 312 and into the reduction/compression circuitry (e.g., data transformation circuit(s) 314) into $Z_i$. Then the WRITE is executed from $Z_i$.

In accordance with the inventive arrangements described within this disclosure, $X_i$ and $Z_i$ are fake buffers with the exception of $X_0$ and $X_{P-1}$. $Y_i$ are all real buffers. Each fake buffer is aliased to FIFO memory 322 of size SFIFO and is accessed via memory interface 308 under control of RX allocator 408, which performs the address remapping. Data movement processor 260 configures the pipeline and initiates the function F and the WRITE immediately. To execute F, data movement processor 260 commands a read from $X_i$ which attempts to read from FIFO memory 322 and blocks until data has been written into FIFO memory 322 by an RDMA WRITE on $X_i$. Simultaneously, the RDMA POE attempts to read $Z_i$ which will also block. Data movement system 150 is unblocked by data being written in $X_i$ by a remotely originated WRITE, which enables the F computation to progress and pushes data into $Z_i$ which allows the locally originated WRITE to progress.

RX allocator 408 performs address remapping as follows. Physical addresses A into a fake buffer are remapped to physical addresses BFIFO+(A mod SFIFO) where BFIFO is the base address for that particular FIFO memory. There may be multiple FIFO memories, for example. The RDMA POE writes to the fake buffer if (A−N)<=SFIFO where N is the number of bytes processed by the downstream computation at any given time. RDMA reads from a fake buffer if (N−A)>0.

In operating as described, certain constraints on the RDMA POE must be observed. These constraints include:
The RDMA POE should be able to execute multiple verbs in parallel. For example, an outgoing WRITE may overlap with the necessary incoming WRITE.
The RDMA POE should not time-out on read requests to fake buffers as such read requests may take longer to resolve given the dependency on incoming WRITE data.
For POEs that allow out-of-order completions, where data for an incoming WRITE is not presented to the destination buffer in order, the RMDA POE should allow the maximum out of order distance to be configured to match the remaining space in the FIFO memory. In cases where this is not possible, the FIFO memory 322 must be able to extend outside the on-chip memory to e.g., to memory 306 or another memory.

Figure 5:
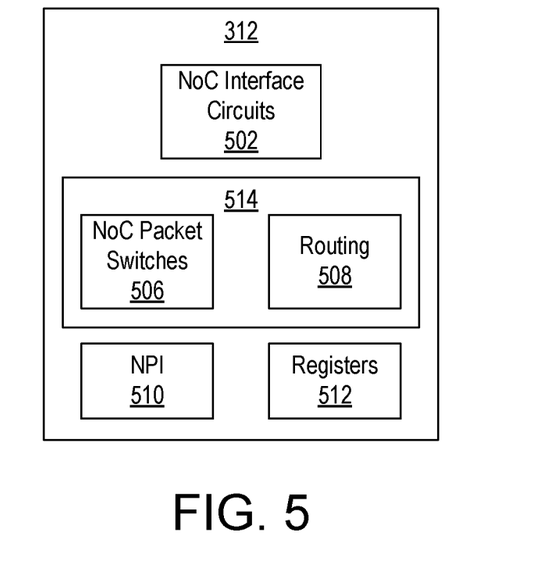
FIG. 5 illustrates an example implementation of a Network-on-Chip (NoC).

FIG. 5 illustrates an example implementation of NoC 312. In the example, NoC 312 includes NoC interface circuits 502, a network 514, NoC peripheral interconnect (NPI) 510, and registers 512. Each NoC interface circuit 502 is capable of operating as an ingress and/or egress circuit that connects an endpoint circuit to NoC 312. NoC interface circuits 502 are connected to one another through network 514. In an example, network 514 includes NoC packet switches 506 and routing 508 between NoC packet switches 506. Each NoC packet switch 506 performs switching of NoC packets. NoC packet switches 506 are connected to each other and to NoC interface circuits 502 through routing 508 to implement a plurality of physical channels. NoC packet switches 506 also support multiple virtual channels per physical channel.

NPI 510 includes circuitry to program NoC interface circuits 502 and NoC packet switches 506. For example, NoC interface circuits 502 and NoC packet switches 506 can include registers 512 that determine functionality thereof. NPI 510 includes a peripheral interconnect coupled to registers 512 for programming thereof to set functionality. Registers 512 in NoC 312 support interrupts, Quality of Service (QoS), error handling and reporting, transaction control, power management, and address mapping control. Registers 512 can be initialized in a usable state before being reprogrammed, such as by writing to registers 512 using write requests. Configuration data for NoC 312 can be stored in a non-volatile memory (NVM), e.g., as part of a programming device image (PDI), and provided to NPI 510 for programming NoC 312 and/or other endpoint circuits.

Endpoint circuits coupled to NoC interface circuits 502 can be hardened circuits (e.g., hardwired circuit blocks 110) or circuits implemented in programmable circuitry. A given endpoint circuit can be coupled to more than one NoC interface circuits 502.

Figure 6:
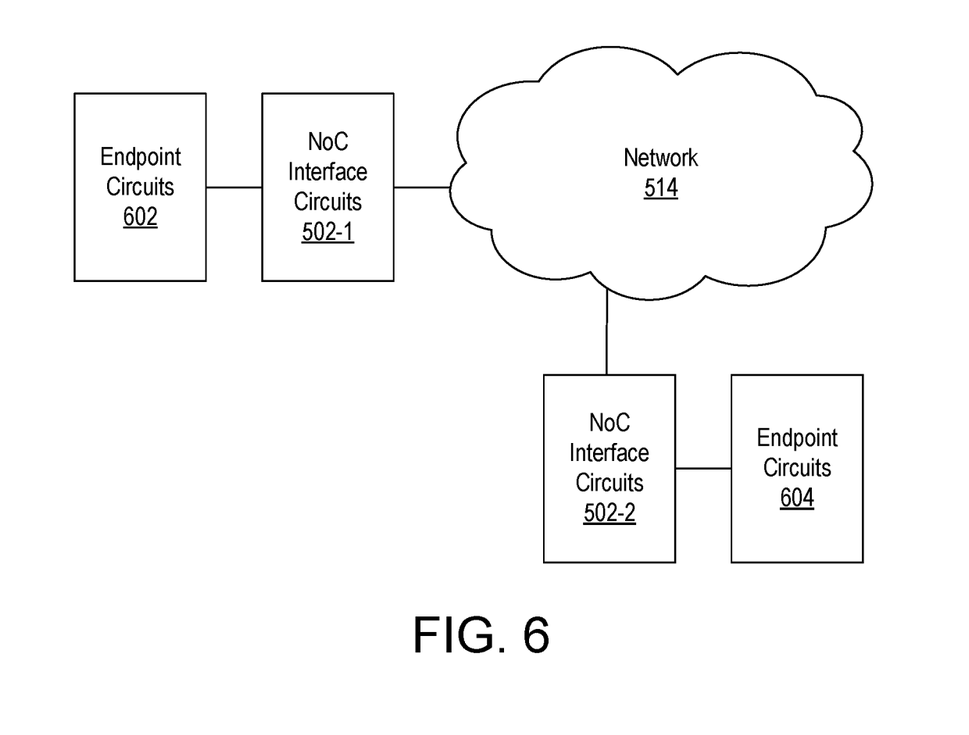
FIG. 6 illustrates an example depicting connections between endpoint circuits through a NoC.

FIG. 6 illustrates an example depicting connections between endpoint circuits through NoC 312 according to an example. In the example, endpoint circuits 602 are connected to endpoint circuits 604 through NoC 312. For example, endpoint circuits 602 may be master circuits, which are coupled to NoC interface circuits 502-1 of NoC 312. Endpoint circuits 604 may be slave circuits coupled to NoC interface circuits 502-2 of NoC 312. Network 514 may include a plurality of physical channels.

Figure 7:
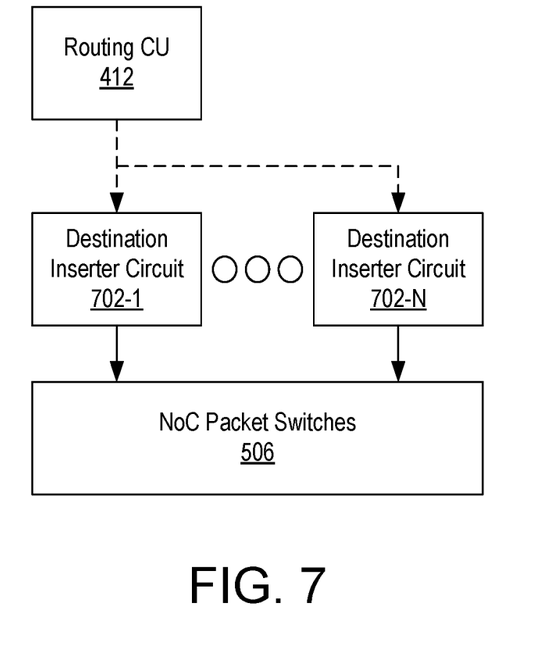
FIG. 7 illustrates an example of a routing compute unit interacting with a NoC to perform dynamic routing.

FIG. 7 illustrates an example of routing compute unit 412 interacting with NoC 312 to perform dynamic routing. In the example of FIG. 7, destination inserter circuits 702 (e.g., 702-1 through 702-N) are included in NoC 312. In one or more example implementations, destination inserter circuits 702 may be disposed in NoC interface circuits 502.

In the example shown, routing compute unit 412 is capable of sending commands (e.g., instructions) destination inserter circuits 702. The commands may be of the type "route N bytes to output interface Y" as previously discussed. Each of destination inserter circuits 702 is capable of executing the instruction received from routing compute unit 412 by chopping up a continuous input data stream into output packets of N bytes and inserting, or embedding, the value "Y" into a destination field of the generated data packets. The destination field is used by NoC packet switches 506 to route the packets to the output interface Y. It should be appreciated that not all of destination inserter circuits 702 need to be active all the time. As such, routing compute unit 412 may instruct a single destination inserter circuit 702 while the other destination inserter circuits 702 remain idle.

Figure 8:
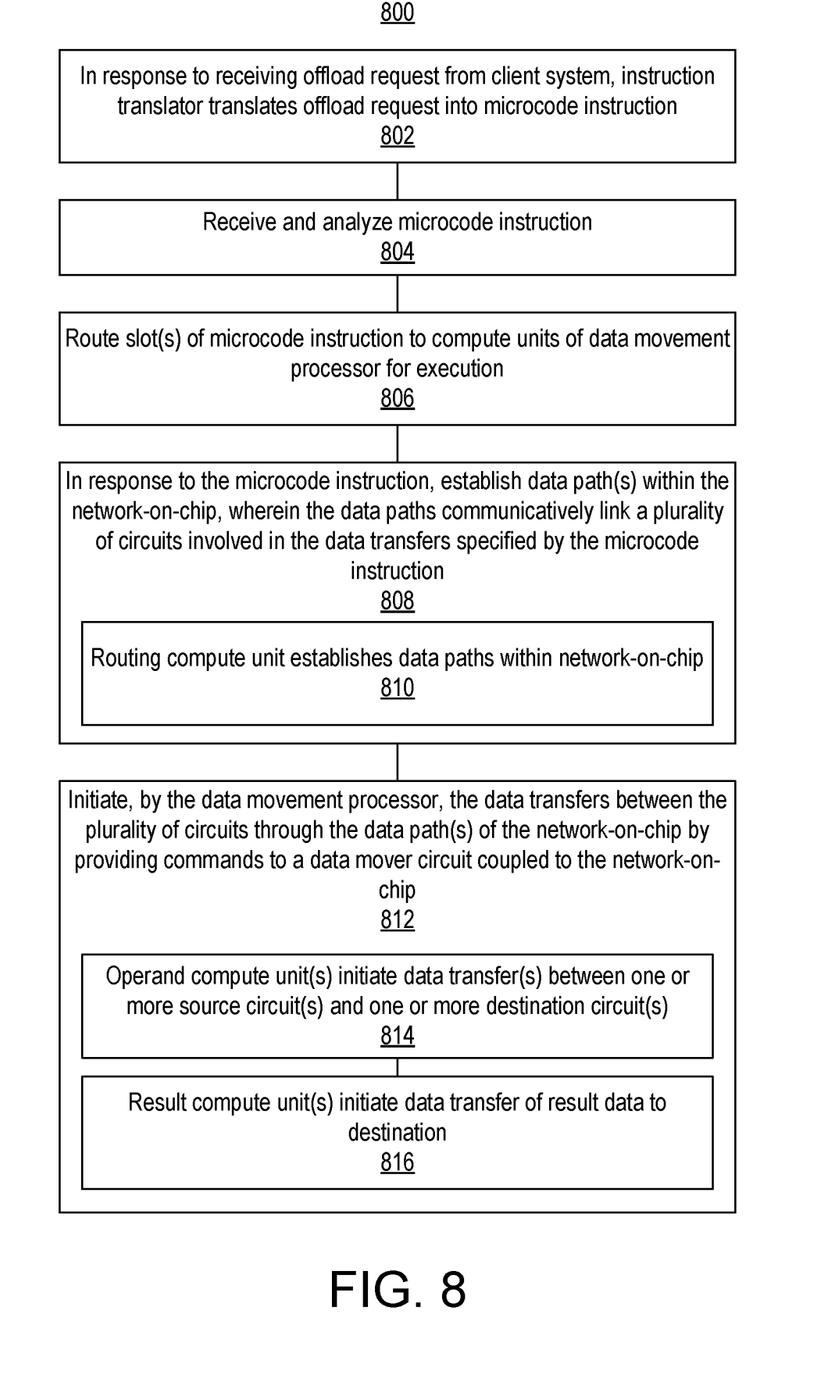
FIG. 8 is an example method illustrating certain operative features of a data movement system and a data movement processor.

FIG. 8 is an example method 800 illustrating certain operative features of data movement system 150 and data movement processor 260.

In block 802, optionally and in response to receiving an offload request from a client system, translator 302 translates the offload request into a microcode instruction.

In block 804, data movement processor 260 receives and analyzes the microcode instruction. As discussed, microcode fetch 402 may receive the microcode instruction from the client system directly or from translator 302. Microcode dispatch 404 obtains the microcode instruction form microcode fetch 402 and performs the analysis. In one aspect, in analyzing the received microcode instruction, microcode dispatch 404 is capable of detecting each of the slots included within the microcode instruction and for each slot, detecting any source circuit(s) and/or destination circuit(s) specified and detecting any operands and/or results specified.

In block 806, microcode dispatch 404 routes slots of the microcode instruction to the various compute units 410 included in data movement processor 260 for execution. The routing of slots to compute units 410 may be performed dynamically as such microcode instructions are received.

In block 808, in response to the microcode instruction, data movement processor 260 establishes one or more data paths within NoC 312. The data paths established within NoC 312 communicatively link a plurality of circuits involved in the data transfers specified by the microcode instruction. For example, in block 810, routing compute unit 412 establishes data paths within NoC 312 using the dynamic routing described herein. Routing compute unit 412 is capable of accessing data path definitions 456 to determine the particular NoC commands 420 that, when issued to NoC 312, configure NoC 312 to implement the data paths needed to effectuate the data transfers specified by the respective slots of the microcode instruction.

In block 812, data movement processor 260 initiates data transfers between the plurality of circuits (e.g., sources and destinations) through the one or more data paths established within NoC 312 by providing commands to one or more data mover(s) 310 coupled to NoC 312. For example, in block 814, one or more operand compute units 412 initiate data transfer(s) between the one or more source circuits (e.g., memory 306 and/or FIFO memory 322) and the one or more destination circuits (e.g., selected data transformation circuit(s) 314, a selected POE interface 316, memory 306, and/or FIFO memory 322). In block 816, one or more result compute units 416 initiate data transfer(s) of results to a destination circuit (e.g., memory 306, FIFO memory 322 of memory interface 308, or a selected POE interface 316 for conveyance of the result via a corresponding POE 318 to network 104 using a network transceiver 320). It should be appreciated that each slot of a microcode instruction need not be occupied. That is, in some cases one or more slots of the microcode instruction may be empty.

In one or more example implementations, data movement processor 260 may utilize overprovisioning of compute units 410 and dynamically allocate data transfers to the compute units 410 such that multiple microcode instructions may be processed in parallel and/or out of order. As noted, each operand compute unit and/or result compute unit may have its own address register file and stride logic. Alternatively, the address register file and stride logic may be shared between operand compute units and result compute units.

The inventive arrangements described herein may be implemented in a variety of different ways. In one or more examples, data movement processor 260 may be implemented in a programmable IC such as a Field Programmable Gate Array (FPGA), in a System-on-Chip (SoC), or the like. Data movement processor 260 may be implemented as a stand-alone design or as a plugin or component within another, larger system such as a NIC. In the case of operating as a plugin or component in a NIC, the POE of data movement system 150 may pull/inject packets from/to the receive/transmit flows. In still other examples, data movement system 150 and/or data movement processor 260 may be implemented as a chiplet attached to the data fabric of a CPU or GPU, with in-package integration, providing collective acceleration to the compute devices.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "individual" and "user" each refer to a human being.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc., may be used herein to describe various elements. These elements should not be limited by these terms, as these terms are only used to distinguish one element from another unless stated otherwise or the context clearly indicates otherwise.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a network-on-chip;
   a plurality of protocol offload engines coupled to the network-on-chip, wherein the plurality of protocol offload engines are configured to generate packets of data for different protocols;

a data movement processor coupled to the network-on-chip, wherein the data movement processor is configured to receive a microcode instruction including a plurality of slots that specify data transfers of a collective communication operation;

wherein the data movement processor distributes the slots of the microcode instruction to a routing compute unit configured to establish data paths in the network-on-chip for the data transfers, an operand compute unit configured to control data mover circuits to move operands of the data transfers, and a result compute unit configured to emit data movement commands to move result data from data transformation circuits to the plurality of protocol offload engines; and a plurality of network transceivers coupled to the plurality of protocol offload engines, wherein the plurality of network transceivers are configured to send the packets of data formatted by the plurality of protocol offload engines.

2. The system of claim 1, wherein each slot specifies a different data transfer initiated by the data movement processor as part of the collective communication operation.

3. The system of claim 1, further comprising:
a configuration memory coupled to the data movement processor, wherein the data movement processor is configured to retrieve, from the configuration memory and in response to the microcode instruction, address information for sending the packets of data.

4. The system of claim 1, wherein the operand compute unit, in response to one or more of the plurality of slots, commands the data mover circuits to move data from a source circuit through the established data paths of the network-on-chip to a selected protocol offload engine.

5. The system of claim 4, further comprising:
a data transformation circuit coupled to the network-on-chip;
wherein the data mover circuits, in response to commands received from the operand compute unit, move data from the source circuit to the data transformation circuit.

6. The system of claim 1, further comprising:
a selected data mover circuit coupled to a random-access memory and to the network-on-chip; and
a memory interface coupled to the random-access memory, the selected data mover circuit, and the protocol offload engine, wherein the memory interface includes a first-in-first-out (FIFO) memory and is configured to intercept data write operations directed to selected addresses of the random-access memory and store data from the data write operations in the FIFO memory in lieu of storing the data in the random-access memory.

7. The system of claim 6, wherein the memory interface is configured to intercept data read operations directed to the selected addresses and read data specified by the data read operations from the FIFO memory instead of directing the data read operations to the random-access memory.

8. The system of claim 6, wherein the protocol offload engine is a remote data memory access engine, wherein the remote data memory access engine is configured to initiate memory read operations and memory write operations to the memory interface.

9. A data movement processor, comprising:
a microcode fetch circuit configured to receive a microcode instruction from a client system, wherein the microcode instruction specifies data transfers of a collective communication operation;

a plurality of compute unit circuits;
a microcode dispatch circuit coupled to the plurality of compute unit circuits and the microcode fetch circuit, wherein the microcode dispatch circuit is configured to distribute slices of the microcode instruction to different ones of the plurality of compute unit circuits to effectuate the collective communication operation;
wherein a selected compute unit circuit of the plurality of compute unit circuits, in response to the microcode instruction, configures a network-on-chip to establish data paths therein that communicatively link different ones of a plurality of circuits for performing the data transfers of the collective communication operation; and
a score board circuit coupled to the microcode dispatch circuit, wherein the score board circuit is configured to track availability of the plurality of compute unit circuits over time.

10. The data movement processor of claim 9, further comprising:
a command align, dispatch, and retire circuit coupled to each of the plurality of compute unit circuits;
wherein the command align, dispatch, and retire circuit is configured to receive commands from the plurality of compute unit circuits and enforce timing rules among the received commands.

11. The data movement processor of claim 10, wherein the command, align, dispatch, and retire circuit is configured to send status information for the plurality of compute unit circuits to the score board circuit, and wherein the score board circuit updates the availability of the plurality of compute unit circuits in response to the status information.

12. The data movement processor of claim 9, further comprising:
a receiver allocator circuit configured to allocate a portion of a random-access memory to data that is received via a network transceiver, wherein the receiver allocator circuit is configured to issue data movement commands to a data mover circuit to move the data as received to a portion of the random-access memory allocated to the data.

13. The data movement processor of claim 12, wherein the receiver allocator circuit is coupled to a selected compute unit circuit of the plurality of compute unit circuits designated for operands, wherein the receiver allocator circuit is configured to receive a query from the selected compute unit circuit for a buffer containing the data and, in response to determining a match to the query, provide an address of the buffer to the selected compute unit circuit.

14. The data movement processor of claim 9, wherein the microcode instruction includes a plurality of slots, wherein each slot specifies a different data transfer of the collective communication operation.

15. The data movement processor of claim 9, wherein a selected compute unit circuit of the plurality of compute unit circuits is configured to issue commands to a data mover circuit to move operand data from a random-access memory through the network-on-chip to one or more destination circuits, wherein the commands are issued by the selected compute unit circuit in response to the microcode instruction.

16. The data movement processor of claim 15, wherein the one or more destination circuits include at least one of a protocol offload engine or a data transformation circuit.

17. The data movement processor of claim 9, wherein a selected compute unit circuit of the plurality of compute unit circuits that handles results is configured to issue commands to a protocol offload engine to transmit result data to another system, wherein the selected compute unit circuit issues the commands in response to the microcode instruction.

18. A method, comprising:
receiving, within a data movement processor disposed in an integrated circuit, a microcode instruction specifying a collective communication operation;
distributing, by a microcode dispatch circuit, slices of the microcode instruction to a plurality of compute unit circuits to effectuate the collective communication operation;
in response to the microcode instruction, establishing data paths, by a selected compute unit of the plurality of compute units, within a network-on-chip disposed in the integrated circuit, wherein the data paths communicatively link a plurality of circuits involved in data transfers that form the collective communication operation as specified by the microcode instruction;
initiating, by the data movement processor, the data transfers between the plurality of circuits through the data paths of the network-on-chip by providing commands to a data mover circuit coupled to the network-on-chip; and
tracking, by a score board circuit coupled to the microcode dispatch circuit, availability of the plurality of compute unit circuits over time.

19. The method of claim 18, further comprising:
storing data directed to selected addresses of a random-access memory to a first-in-first-out (FIFO) memory in lieu of the random-access memory; and
reading the data from the FIFO memory in response to read operations specifying the selected addresses instead of directing the read operations to the random-access memory.

* * * * *